United States Patent [19]

Peikin

[11] Patent Number: 4,864,763
[45] Date of Patent: Sep. 12, 1989

[54] TEMPERATURE MEASUREMENT APPARATUS FOR USE IN RECREATIONAL AND SPORTING ACTIVITIES

[76] Inventor: Aaron J. Peikin, 315 N. Wayne Ave., Wayne, Pa. 19087

[21] Appl. No.: 266,884

[22] Filed: Nov. 3, 1988

Related U.S. Application Data

[63] Continuation-in-part of Ser. No. 922,876, Oct. 24, 1986, Pat. No. 4,782,617.

[51] Int. Cl.⁴ .................. A01K 89/00; G04B 47/00
[52] U.S. Cl. ............................ 43/18.1; 43/4; 135/65; 280/819
[58] Field of Search .............. 43/4, 4.5, 17.1, 18.1, 43/25; 135/65, 67, 70; 280/819, 820

[56] References Cited

U.S. PATENT DOCUMENTS

| | | | |
|---|---|---|---|
| 3,561,267 | 2/1971 | Costello | 43/4 |
| 3,683,356 | 8/1972 | D'Amore | 43/17.1 |
| 3,785,079 | 1/1974 | Rohn | 43/4 |
| 3,874,108 | 4/1975 | Connor | 43/25 |
| 3,968,586 | 7/1976 | Peterson | 43/4.5 |
| 4,050,180 | 9/1977 | King | 43/4 |
| 4,244,220 | 1/1981 | Henson et al. | 280/819 |
| 4,445,178 | 4/1984 | Scheer et al. | 43/4 |
| 4,621,447 | 11/1986 | Rhodes | 43/18.1 |
| 4,625,447 | 12/1986 | Buchanan | 43/17.1 |
| 4,731,766 | 3/1988 | Bunyea | 280/819 |

*Primary Examiner*—M. Jordan
*Attorney, Agent, or Firm*—Benasutti and Murray

[57] ABSTRACT

A temperature measuring device includes a temperature sensor which is located adjacent one end of an elongated member such as a hiking/wading staff or a fishing rod. A temperature measurement display device is located in the vicinity of the other end of the elongated member. Selectable predetermined temperature alarm limits are included to provide visual, or audible and/or tactile alarms when the temperature measured by the temperature sensor exceeds the predetermined alarm limits. In another embodiment, the temperature sensor is electrically connected to the temperature measurement display through a connector disposed in a fishing reel which, when mounted on the handle of the fishing rod, effects the electrical connection between the temperature sensor and the temperature measurement display to be made.

34 Claims, 3 Drawing Sheets

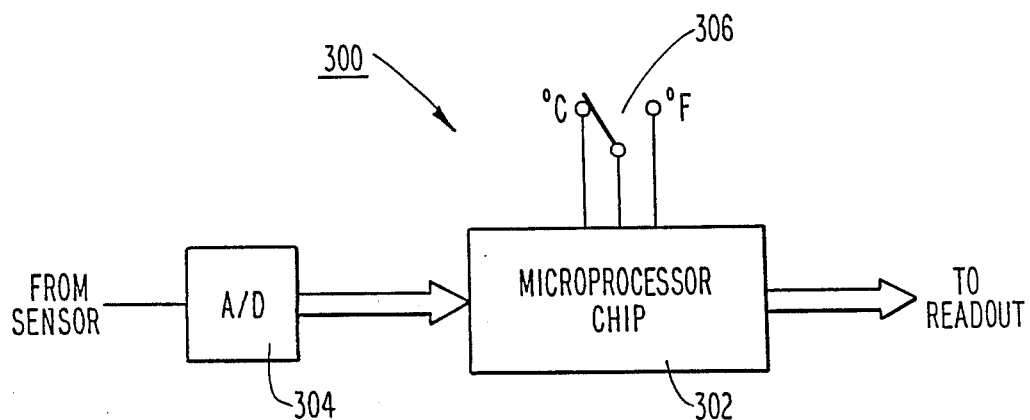
_Fig. 3_
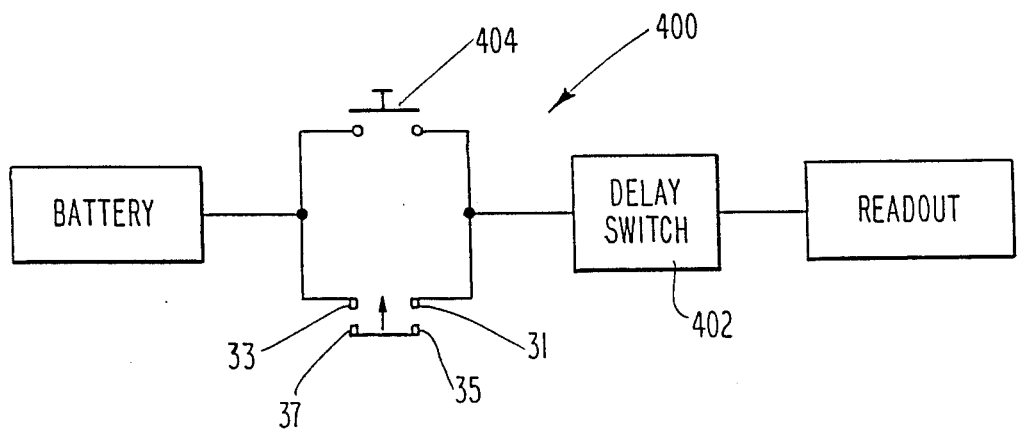
_Fig. 4_

TEMPERATURE MEASUREMENT APPARATUS FOR USE IN RECREATIONAL AND SPORTING ACTIVITIES

CROSS REFERENCE TO RELATED PATENT APPLICATIONS

This application is a continuation-in-part of co-pending U.S. patent application Ser. No. 922,876, filed Oct. 24, 1986 now U.S. Pat. No. 4,782,617 issued Nov. 8, 1988.

BACKGROUND OF THE INVENTION

This invention relates to apparatus for use by outdoors persons and more particularly to apparatus for use by hikers, fishermen and others desiring to measure and monitor ambient air temperature and/or water temperatures at pre-selected locations and depths.

It is known that fish are more prone to feeding when the water is at a certain temperature or within a certain temperature range. Consequently, many serious fishermen carry thermometers or other temperature measuring devices to enable them to determine when and where the fish are more likely to bite. These temperature measurement devices typically take the form of a thermometer connected to the end of a string. The thermometer is thrown into the water while grasping the string in order to measure the temperature at predetermined locations and depths. This is a rather inconvenient procedure which requires carrying another piece of gear, that is the string and thermometer; retrieving the thermometer from the pocket or other storage location, unraveling the string, throwing the thermometer into the water, and letting it sink to the desired depths.

In addition to being inconvenient, the procedure is unsatisfactory in that it is often difficult to insure that the thermometer has been positioned at the desired location and depth and maintain the thermometer at that position. For example, in swift currents, the thermometer will have a tendency to drift thereby making it difficult to measure the temperature at the desired location and depth. Even if it is possible to place the thermometer in the desired location, it must remain there for a period of time sufficient to permit the thermometer reading to stabilize. Once again, this is difficult in locations where the water is in motion. Finally, after the temperature reading has stabilized the thermometer must be retrieved by winding in the string then returning the apparatus to its storage location after reading the indicated temperature. Quite often, this procedure entails the use of both hands. As a result, it is difficult to hold other objects, for example a fishing pole, at such times.

The apparatus described and claimed in the parent application overcame these difficulties by providing a water temperature measuring device in which a temperature sensor is located adjacent one end of an elongated member such as a hiking/wading staff or a fishing rod. A temperature read-out device is located in the vicinity of the other end of the elongated member. The output of the temperature sensor is coupled to the temperature read-out device by appropriate means supported in or on the elongated member.

It is an object of the present invention to provide a water temperature measuring device of the type shown and described in the parent application with an alarm to indicate when temperature extremes are exceeded.

It is another object of the present invention to provide the water temperature measurement device with an alarm when a specific temperature is detected.

It is still another object of the present invention to provide the water temperature measuring device with means for providing temperature read-out in accordance with a pre-selected scale.

It is yet another object of the present invention to provide a water temperature measuring device with a plurality of battery sources and means for automatically turning the power sources off in order to extend their life.

It is still another object of the present invention to provide a water temperature measuring device which will measure ambient air temperature as well as water temperature.

These and other objects of the present invention will become apparent to those skilled in the art upon consideration of the following description of the invention.

SUMMARY OF THE INVENTION

The present invention comprises a water temperature measuring device in which a temperature sensor is located adjacent one end of an elongated member such as a hiking/wading staff or fishing rod. A temperature read-out device is located in the vicinity of the other end of the elongated member. The output of the temperature sensor is coupled to the temperature read-out device by appropriate means supported in or on the elongated member.

In one embodiment, the temperature sensor is embedded in the tip of a fishing rod. The temperature read-out is, for example, a light emitting diode (LED) or liquid crystal display (LCD) positioned in the rod handle or shaft adjacent to the handle. A sensor wire, connecting the temperature sensor to a connector is, for example embedded in, laid upon or wrapped around the fishing rod between the tip and the connector which is preferably embedded in the handle of the fishing rod. The other end of the connector is electrically connected to the read-out. The connector is configured such that when a reel has been mated to the rod handle, an electrical connection is made between the temperature sensor and the read-out. The power source is a battery stored in the handle of the fishing rod, a solar power source embedded in the handle or a combination where the solar power source is used to recharge the battery.

In an alternate preferred embodiment, a sensor wire, embedded in, laid upon or wrapped around the fishing rod between the tip and the handle, connects the temperature sensor to the read-out. Alarm limit means are disposed in the fishing rod handle which means enables the user to selectively set upper and lower temperature limits whereby temperature sensed beyond these limits will cause the activation of an alarm such as a vibrator in the handle of the fishing rod; a visual alarm such as a blinking light disposed in the handle; and/or an audible alarm such as a buzzer disposed in the handle. In yet another alternate preferred embodiment of the present invention, the alarm means is disposed in the reel and is activated upon mating the reel to the rod.

In yet another alternate preferred embodiment, computer means is disposed in the fishing rod handle to enable the user to automatically select between Fahrenheit temperature readings and Centigrade temperature readings. In still another alternate embodiment, an additional sensor is disposed adjacent the fishing rod handle, which sensor measures the ambient air temperature.

The output of this sensor can be connected either to the existing temperature sensor in the handle or, in which configuration a switch enables the user to switch between air temperature and water temperature; or it may be connected to its own air temperature read-out.

In still a further embodiment of the present invention, circuit means is included to automatically shut off the power source within a predetermined time after use of the sensor in order to conserve energy.

In another embodiment, the above-described features of the present invention are incorporated in a hiking-/wading staff.

Other objects, features and advantages of the present invention will become more fully apparent from the following detailed description of the preferred embodiment, the appended claims and the accompanying drawings.

BRIEF DESCRIPTION OF THE DRAWINGS

FIG. 3 is a block diagram of a Fahrenheit/Centigrade conversion apparatus for use with the temperature measuring device in accordance with the present invention.

FIG. 4 is a block diagram of a power source including automatic power shut off in accordance with the present invention.

DETAILED DESCRIPTION OF THE INVENTION

Figure 1:
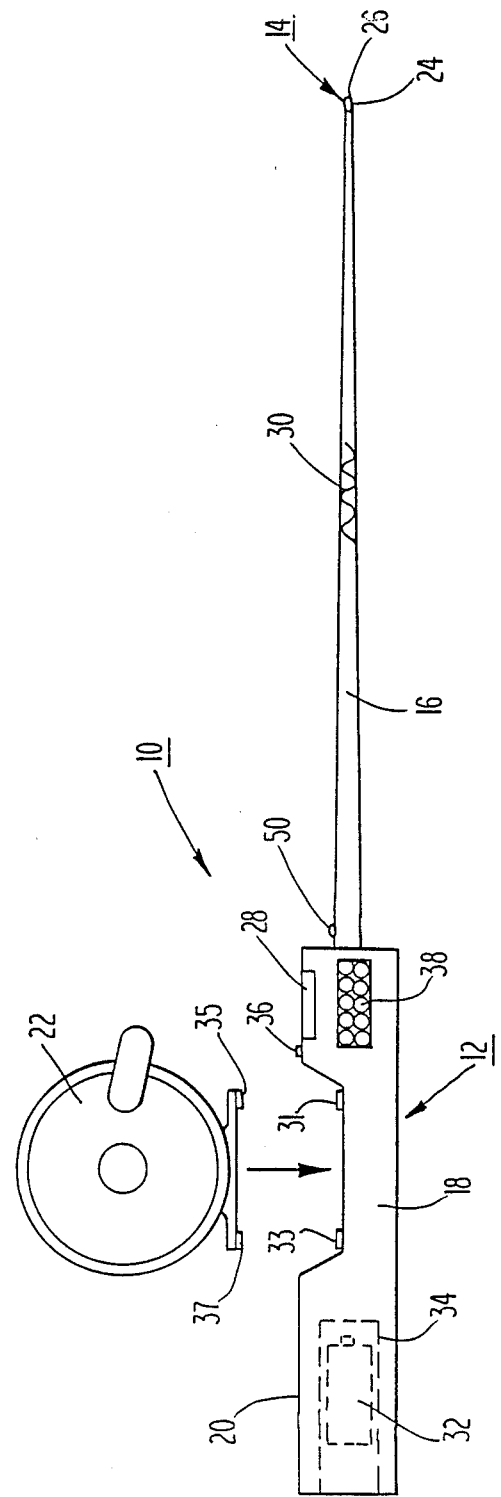
FIG. 1 is a side view of a fishing rod incorporating a temperature measurement apparatus wherein electrical connection between the temperature sensor and the read-out is made by attaching a reel to the fishing rod.

Although specific forms of the invention have been selected for illustration in the drawing, and the following description is drawn in specific terms for the purpose of describing these forms of the invention, this description is not intended to limit the scope of the invention which is defined in the appended claims.

Referring to FIG. 1, there is shown a side view of a fishing rod, generally designated 10, incorporating the temperature measurement apparatus in accordance with the present invention. The fishing rod 10 comprises a handle portion 12, a tip portion 14 and a shaft portion 16 extending between the handle portion 12 and the tip portion 14. The handle portion 12 has a grip segment 18 and a reel mounting segment 20.

A temperature measurement sensor 24 is positioned adjacent the tip portion 14 of the fishing rod 10. In the preferred embodiment, the temperature measurement sensor 24 preferably comprises a transducer which converts temperature measurements to electrical signal such as, for example, a thermocouple which is embedded in the tip of the rod portion 16 of the fishing rod 10. Alternatively, the temperature measurement sensor 24 can be mounted on the surface of the rod 16 adjacent to tip portion 14 or mounted as part of an eyelet 26 which is attached to the tip portion 14 of the fishing rod 10.

The temperature sensor 24 is electrically connected to a first set of electrical contacts 31 disposed in the reel mounting segment 20 of the handle portion 12 by electrically conductive means such as, for example, wires 30 which extend along the shaft 16 of the fishing rod 10. The wires may be wrapped around and affixed to the shaft 16, embedded in the shaft or disposed in a conduit within the shaft 16. The electrically conductive means can alternately comprise carbon elements embedded in the shaft portion 16.

A second set of electrical contacts 33 are electrically connected to a read-out device 28 through appropriate electrical interface circuitry by electrically conductive means such as, for example, wires which are contained within the handle portion 12. Electrical interface circuitry required to convert the electrical signal from the temperature sensor 24 to a digital read-out format as displayed by the liquid crystal display (LCD) or light omitting diode (LED) read-out device 28 is preferably contained within the handle portion 12.

The reel 22 contains a third set of electrical contacts 35 which are electrically connected to a fourth set of electrical contacts 37. The third set 35 and fourth set 37 of electrical contacts are positioned on the reel 22 such that when the reel 22 mates with the reel mounting segment 20, electrical contact is made between the first set 31 and the third set 35 electrical contacts; and electrical contact is made between the second set 33 and further set 37 of electrical contacts. As a result, mounting the reel 22 on the reel mounting segment 20 causes electrical continuity to occur between the electrical sensor 24 and the read-out device 28 through the electrical interface circuitry.

The temperature read-out 28 is preferably disposed in the grip segment 18 adjacent the shaft 16. Although this is the preferred location of the read-out 28, it should be noted that it could be disposed in any other convenient location within the grip segment 18 and still come within the scope and contemplation of the present invention. The temperature read-out device 28 is, for example, a liquid crystal display (LCD) which continuously displays the temperature sensed by the temperature sensor 24. Back lighting, powered by an electrical power source, such as a battery 32 disposed in a battery compartment 34 located with the grip segment 18 is preferably provided to illuminate the LCD under low ambient light conditions.

The back lighting can be selectively turned on by means of a switch, for example, a push button switch 36 disposed in the grip segment 18 in a location which is conveniently operable by thumb or finger. Alternatively, the temperature read-out device can be a light emitting diode (LED) display which is power by an electrical power source such as a battery 32 disposed within the battery compartment 34. The LED display can be selectively illuminated by activating a switch, for example the push button switch 36, disposed in the grip segment 18. It should be noted that the battery providing electrical power can be a carbon-zinc battery, a nickel cadmium, a lithium battery or other types of battery which supply electrical energy.

A solar power source 38 may be disposed in the grip segment 18 adjacent the shaft portion 16 of the rod 10. Although this is a preferred location, the solar powered source can be located in any convenient location in the grip segment 18. The solar power source preferably comprises at least one solar cell which convert sunlight into electrical power. Solar power source 38 can be used to power back lighting for an LCD temperature read-out device; as power for an LED display; or as power to recharge a rechargeable battery 32 disposed in the battery compartment 34. The solar power source can also be used in the dual role of supplying power to the temperature read-out device 28 as well as to recharge the battery 32.

Although the temperature sensor 24 can be used to measure ambient air temperature as well as water temperature, in an alternate preferred embodiment, a second temperature sensor 50 is disposed on the shaft portion 16 of the rod 10 adjacent the handle portion 12 for measuring air temperature. The second temperature sensor 50 is electrically connected to the read-out device 28, through the appropriate electrical interface circuitry either by direct connection or through additional sets of mating contacts in the reel mounting segment 20 and the reel 22. When the second temperature sensor 50 is connected to the read-out device 28, a switch (not shown) is preferably used to switch between the first temperature read-out device (which will typically measure water temperature at a desired location) and the second temperature sensor 50 which will measure ambient air temperature. In the alternative, the second temperature sensor 50 can be electrically connected to its own read-out device thereby providing continuous read-out of the ambient air temperature. The second read-out device can be an LCD with selective back lighting or an LED display.

Figure 2:
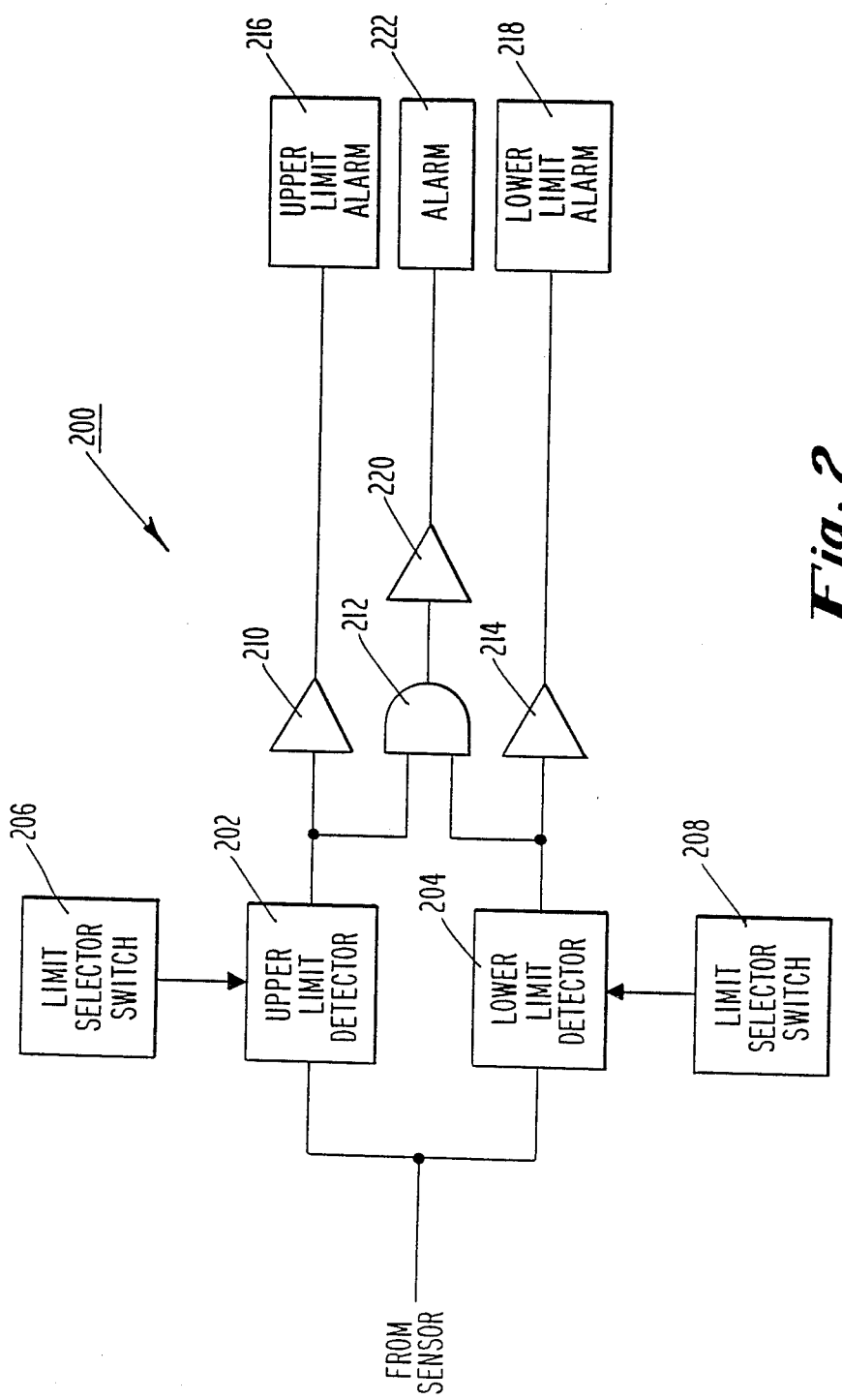
FIG. 2 is a block diagram of an apparatus for providing temperature alarms in accordance with the present invention.

Referring now to FIG. 2, there is shown a block diagram of an alarm circuit for use in connection with the temperature measurement apparatus of the present invention. The alarm circuit, generally designated 200, comprises an adjustable upper limit detector 202 and an adjustable lower limit detector 204. The adjustable upper limit detector 202 is adjusted by a first limit selector switch 206 which is preferably mounted in the handle portion 12. The adjustable lower limit detector is adjusted by a second limit selector switch 208 which is also preferably mounted in the handle portion 12. In the preferred embodiment, each limit selector switch comprises two digit switches, one to set the units portion of the limit and one to set the tens portion of the limit whereby each limit can be adjusted from 00 to 99 degrees Fahrenheit or Centigrade.

It should be noted that in an alternate preferred embodiment the upper limit and lower limit are each set by a fast scan pushbutton switch which, when depressed, will electronically scan the available limits (for example 0° to 100° Centigrade) at a predetermined fast scan rate and will stop at a particular limit when the switch is released. Such a fast scan switch could also be augmented by a slow scan switch which, when depressed, will electronically scan the limits at a predetermined slow scan rate which is slower than the fast scan rate in order to enable the user to precisely select a predetermined limit. In this embodiment, the user would depress the fast scan switch until the approximate limit appears on the display, then get the exact limit by depressing the slow scan switch until the exact limit appears in the display.

In yet another alternate preferred embodiment, one switch is associated with the units portion of the limit while another switch is associated with the tens portion. For wider limits, there could be a third switch associated with the hundreds portion of a limit. In this embodiment, the user would set the limit by depressing the units switch until the desired units digit of the limit appears in the display; depressing the tens switch until the desired tens digit of the limit appears in the display; and, if applicable, depressing the hundreds digit of the limit switch until the desired hundreds unit appears in the display. In these alternate preferred embodiments there could be a switch or set of switches for each limit or there could be one switch or set of switches with another switch to select either the upper limit or the lower limit, depending upon which limit is being programmed. In addition, the scan could either be a continuous wrap around scan that need only be advanced in a single direction, (for example, upon reaching the highest selectable limit number, the scan would return to the lowest selectable limit number and continue incrementing) or it could be incremented and decremented in order to achieve the desired limit.

As shown in FIG. 2, the sensor 24 is electrically connected to the inputs of the adjustable limit detector 202 and the adjustable lower limit detector 204. The output of the adjustable upper limit detector 202 is coupled to a first amplifier 210 and one input of a two input OR-gate 212. The output of the adjustable lower limit detector 204 is coupled to a second amplifier 214 and the second input of the two input OR-gate 212. The output of the first amplifier 210 is coupled to an upper limit alarm 216. The output of the second amplifier 214 is coupled to the input of a lower limit alarm 218. The upper and lower limit alarms can be, for example, LED's which illuminate when either the upper limit or lower limit has been reached; they may also be tone generators which generate different tones for example, a high tone when the upper limit has been reached and a lower tone when the lower tone has been reached.

The output of the OR-gate 212 is coupled to the input of a third amplifier 220. The output of the third amplifier 220 is coupled to an alarm 222, for example an audible alarm, a visual alarm, or a tactile alarm such as a vibrator disposed in the handle portion 12. In this way, either an audible, or visual or a tactile alarm, or any combination of such alarms, will be initiated when the temperature reaches either the upper limit or the lower limit.

Although FIG. 2 sets forth the alarms being triggered by reaching an upper limit or a lower limit, an alarm could also be trigger upon reaching a specific desired temperature which is set in a single set of digit switches. In this way, the user can set the desired temperature by means of the digit switches then using the temperature sensor 24, probe the waters until the alarm goes off which signifies that the temperature sensor has now reached a location at which the water is at the desired temperature. It should be noted that the alarms can be either visual, audible or tactile (for example vibration) or any combination thereof and such is to be considered within the scope and contemplation of the present invention.

Referring now to FIG. 3, there is shown Fahrenheit to Centigrade conversion apparatus which is generally designated 300. The conversion apparatus 300 preferably comprises a microprocessor chip 302 which is preferably mounted in the handle portion 12. The conversion apparatus also comprises an analog to digital converter 304. In this embodiment of the present invention, the temperature sensor 24 is electrically coupled to the analog input of the analog to digital computer 304. The digital output of the analog to digital converter 304 is coupled to data input port of the computer 302. Data output ports of the computer 302 are coupled to the read-out device 28. A Centigrade/Fahrenheit switch 306 is connected to the computer 302. The computer 302 stores a look-up table which converts the input digital data signal to an output signal in either Fahrenheit or Centigrade depending upon the position of the switch 306. The information storage media can be a read only memory (ROM) internal to the computer; a programmable read only memory (PROM) external to the computer or a combination of such storage media or any other storage media accessible to the computer.

Referring now to FIG. 4, there is shown a block diagram of a battery life extension circuit designated 400. The battery life extension circuit 400 comprises a delay switch 402 which is activated by mounting the reel 22 on the reel mounting segment 20 thereby causing an electrical contact to be made between the mating contacts as previously described. This causes the delay switch 402 to close for a predetermined period of time. At expiration of that predetermined time, the switch will open. This delay switch operation can also be initiated by push button 404 which is preferably mounted in the handle portion 12. Closing of the switch for the predetermined period of time will apply battery power to the read-out enabling the user to view the read-out for the predetermined period of time following which the battery is automatically disconnected. This prevents a continuous drain of electrical energy from the battery. The delay switch can be, for example, a solid state switch controlled by an R—C (resistance-capacitance) delay network as is known in the art.

Although the embodiments of the present invention have been previously described herein with respect to a fishing rod, all the embodiments, except that relating to the mating electrical connector means disposed in the reel adapted for mounting in the reel mounting segment of the fishing rod, are usable in a hiking/wading staff. The hiking/wading staff, like the fishing rod, comprises a handle portion, a tip portion and a shaft portion extending between the handle portion and the tip portion. A temperature measurement sensor is positioned adjacent the tip portion and is electrically interconnected with temperature measurement display means, an electrical power source and means for selecting at least one predetermined temperature alarm limit, all of which are preferably disposed in the handle portion of the staff. The details of such embodiments described with respect to the fishing rod, are equally applicable to the hiking/wading staff embodiment and the description of such details are considered to be applicable to the hiking/wading staff embodiment as if fully repeated again with respect to such embodiment.

As can be seen the alternate embodiments of the present invention described above permits the user to automatically enable the temperature measurement system by mounting the reel to the rod. The battery life extension circuit permits the user to read the temperature sensor for a predetermined period of time following which the battery is disconnected thereby conserving battery life. The user may also measure ambient air temperature as well as water temperature and convert these readings from Fahrenheit to Centigrade as desired.

The user will also be warned when the temperature exceeds predetermined limits or when the temperature reaches the desired magnitude by visual, audible or vibrating alarm indicators.

It will be understood that various changes in the details, materials and arrangement of the parts which have been herein described and illustrated in order to explain the nature of this invention may be made by those skilled in the art within the principal and scope of the invention as expressed in the following claims.

I claim:

1. In a fishing rod comprising a shaft portion having a tip portion at one end and a handle portion at the other end, said handle portion comprising a grip segment and a reel mounting segment, an improvement comprising:
   (a) temperature sensing means mounted adjacent the tip portion;
   (b) temperature measurement display means disposed in said handle portion; and
   (c) means for electrically connecting said temperature sensing means to said temperature measurement display means comprising:
      (i) means for electrically connecting said temperature sensing means to at least a first contact in an electrical connector disposed in said reel mounting segment;
      (ii) means for electrically connecting said temperature measurement display means to at least a second contact of said connector; and
      (iii) mating electrical connector means disposed in a reel adapted for mounting in said reel mounting segment whereby an electrical connection is made between said at least first contact and said at least second contact through said mating connector when said reel is mounted in said reel mounting segment.

2. The fishing rod in accordance with claim 1 wherein said temperature sensing means comprises a thermocouple.

3. The fishing rod in accordance with claim 2 wherein said temperature measurement display means comprises a liquid crystal display.

4. The fishing rod in accordance with claim 2 wherein said temperature measurement display means comprises a light emitting diode display.

5. The fishing rod in accordance with claim 2 wherein said temperature measurement display means includes an electrical power source comprising an electrical storage battery removably disposed in a battery compartment in said handle portion.

6. The fishing rod in accordance with claim 2 wherein said temperature measurement display means includes an electrical power source comprising a solar power source.

7. The fishing rod in accordance with claim 6 wherein said solar power source comprises at least one solar cell disposed in said grip segment of said handle portion.

8. The fishing rod in accordance with claim 2 wherein said temperature measurement display means includes an electrical power source comprising:
   (a) a rechargeable electric storage battery removably disposed in a battery compartment in said handle portion; and
   (b) a solar power source adapted to recharge said rechargeable electrical storage battery.

9. The fishing rod in accordance with claim 8 wherein said solar power source comprises at least one solar cell disposed in said grip segment of said handle portion.

10. The fishing rod in accordance with claim 2 additionally comprising a second temperature sensing means mounted adjacent said handle portion.

11. In a fishing rod comprising a shaft portion having a tip portion at one end and a handle portion at the other end, said handle portion comprising a grip segment and a reel mounting segment, an improvement comprising:
   (a) temperature sensing means disposed adjacent said tip portion;
   (b) temperature measurement display means disposed in said handle portion;

(c) means for selecting at least one predetermined temperature alarm limit;
(d) an electrical power source; and
(e) means for electrically interconnecting said temperature sensing means, said alarm limit selection means, said temperature measurement display means, and said electrical power source.

12. The fishing rod in accordance with claim 11 additionally comprising means for generating an alarm when the temperature sensed by said temperature sensing means exceeds said selected predetermined alarm limit.

13. The fishing rod in accordance with claim 12 additionally comprising means for selecting a predetermined upper temperature alarm limit and a predetermined lower temperature alarm limit.

14. The fishing rod in accordance with claim 13 additionally comprising means for generating an alarm when the temperature sensed by said temperature sensing means is above said predetermined upper temperature alarm limit and for generating an alarm when the temperature sensed by the temperature sensing means is below said predetermined lower temperature alarm limit.

15. The fishing rod in accordance with claim 14 wherein said alarm comprises a visual alarm.

16. The fishing rod in accordance with claim 14 wherein said alarm comprises an audible alarm.

17. The fishing rod in accordance with claim 14 wherein said alarm comprises a tactile alarm.

18. The fishing rod in accordance with claim 11 wherein said temperature measurement display means displays a temperature measurement which is selectable in either units of degrees Fahrenheit or degrees Centigrade.

19. The fishing rod in accordance with claim 11 wherein said electrical power source comprises an electric storage battery removably disposed in a battery compartment in said handle portion.

20. The fishing rod in accordance with claim 19 additionally comprising means for electrically disconnecting said power source after a predetermined time.

21. The fishing rod in accordance with claim 20 wherein said electrical power source comprises:
(a) a rechargeable electrical storage battery removably disposed in a battery compartment in said handle portion; and
(b) a solar power source adapted to recharge said rechargeable electric storage battery.

22. The fishing rod in accordance with claim 21 wherein said solar power source comprises at least one solar cell disposed in said grip segment of said handle portion.

23. In a wading staff comprising a shaft portion having a tip portion at one end and a handle portion at the other end, an improvement comprising:

(a) temperature sensing means disposed adjacent said tip portion;
(b) temperature measurement display means disposed in said handle portion;
(c) an electrical power source;
(d) means for selecting at least one predetermined temperature alarm limit; and
(e) means for electrically interconnecting said temperature sensing means, said temperature measurement display means, said electrical power source and said alarm limit selection means.

24. The wading staff in accordance with claim 23 additionally comprising means for generating an alarm when the temperature sensed by said temperature sensing means exceeds said selected predetermined alarm limit.

25. The wading staff in accordance with claim 24 additionally comprising means for selecting a predetermined upper temperature alarm limit and a predetermined lower temperature alarm limit.

26. The wading staff in accordance with claim 25 additionally comprising means for generating an alarm when the temperature sensed by said temperature sensing means is above said predetermined upper temperature alarm limit and for generating an alarm when the temperature sensed by the temperature sensing means is below said predetermined lower temperature alarm limit.

27. The wading staff in accordance with claim 26 wherein said alarm comprises a visual alarm.

28. The wading staff in accordance with claim 26 wherein said alarm comprises an audible alarm.

29. The wading staff in accordance with claim 26 wherein said alarm comprises a tactile alarm.

30. The wading staff in accordance with claim 23 wherein said temperature measurement display means displays a temperature measurement which is selectable in either units of degrees Fahrenheit or degrees Centigrade.

31. The wading staff in accordance with claim 23 wherein said electrical power source comprises an electric storage battery removably disposed in a battery compartment in said handle portion.

32. The wading staff in accordance with claim 31 additionally comprising means for electrically disconnecting said power source after a predetermined time.

33. The wading staff in accordance with claim 32 wherein said electrical power source comprises:
(a) a rechargeable electrical storage battery removably disposed in a battery compartment in said handle portion; and
(b) a solar power source adapted to recharge said rechargeable electric storage battery.

34. The wading staff in accordance with claim 33 wherein solar power source comprises at least one solar cell disposed in said handle portion.

* * * * *